United States Patent
Herbert

(10) Patent No.: US 7,656,867 B2
(45) Date of Patent: Feb. 2, 2010

(54) SERIAL BUS IDENTIFICATION CIRCUIT FOR A COMPUTER CHIP ENCLOSED IN A STAINLESS STEEL CAN

(75) Inventor: Edmund E. Herbert, Charlotte, NC (US)

(73) Assignee: Marcon International, Inc., Harrisburg, NC (US)

( * ) Notice: Subject to any disclaimer, the term of this patent is extended or adjusted under 35 U.S.C. 154(b) by 799 days.

(21) Appl. No.: 10/996,687

(22) Filed: Nov. 24, 2004

(65) Prior Publication Data

US 2005/0111443 A1 May 26, 2005

Related U.S. Application Data

(60) Provisional application No. 60/481,700, filed on Nov. 25, 2003.

(51) Int. Cl.
*H04Q 11/00* (2006.01)
(52) U.S. Cl. .................... 370/360; 340/825.52
(58) Field of Classification Search ......... 370/360–363; 340/825.52
See application file for complete search history.

(56) References Cited

U.S. PATENT DOCUMENTS

| | | | | |
|---|---|---|---|---|
| 5,528,749 | A * | 6/1996 | Landis et al. ................. | 714/23 |
| 5,812,821 | A * | 9/1998 | Sugi et al. ..................... | 703/25 |
| 6,513,091 | B1 * | 1/2003 | Blackmon et al. ........... | 710/316 |
| 6,587,873 | B1 * | 7/2003 | Nobakht et al. ............. | 709/219 |
| 6,996,750 | B2 * | 2/2006 | Tetreault ..................... | 714/44 |
| 7,000,054 | B2 * | 2/2006 | Kwong et al. ............... | 710/302 |
| 7,058,011 | B1 * | 6/2006 | Stearns et al. ............... | 370/219 |
| 7,069,477 | B2 * | 6/2006 | Bland et al. ................. | 714/43 |
| 7,213,766 | B2 * | 5/2007 | Ryan et al. .................. | 235/492 |
| 7,228,155 | B2 * | 6/2007 | Saunders, Peter D. ...... | 455/558 |
| 7,362,229 | B2 * | 4/2008 | Brinton et al. ........... | 340/572.1 |
| 2002/0028704 | A1 * | 3/2002 | Bloomfield et al. ............ | 463/1 |
| 2002/0037699 | A1 * | 3/2002 | Kobayashi et al. ............ | 455/41 |
| 2002/0178207 | A1 * | 11/2002 | McNeil ...................... | 709/102 |
| 2002/0194548 | A1 * | 12/2002 | Tetreault ..................... | 714/43 |
| 2003/0075597 | A1 * | 4/2003 | Mackay et al. .............. | 235/379 |
| 2003/0167345 | A1 * | 9/2003 | Knight et al. ............... | 709/249 |
| 2004/0138768 | A1 * | 7/2004 | Murray et al. ............... | 700/90 |

* cited by examiner

*Primary Examiner*—William Trost, IV
*Assistant Examiner*—Roberta A Shand
(74) *Attorney, Agent, or Firm*—Clements Bernard PLLC; Christopher L. Bernard

(57) ABSTRACT

The invention is a serial bus identification circuit for a module that enables a microcontroller or microprocessor to identify one or many modules, each having an iButton digital device. The invention enables electronic activating and identifying the digital device amongst a plurality of similar devices. Each digital device has a unique digital registration number, and is an element of a module. In addition to the digital device, the module has a dual addressable switch component having a first switch and second switch, where the dual addressable switch component has a unique digital address; a light emitting source; and a source of electrical power. The dual addressable switch component and the unique digital device are in electrical communication with the serial data bus, and can be added as modules. When the first switch of the unique addressable component is closed, the digital device can be accessed, and the unique digital registration number can be down loaded and correlated to the dual addressable switch component. The second switch of the unique addressable component can be closed activating the light emitting source utilizing the source of electrical power. The light emitting source provides an identifying position signal for the device.

11 Claims, 1 Drawing Sheet

SERIAL BUS IDENTIFICATION CIRCUIT FOR A COMPUTER CHIP ENCLOSED IN A STAINLESS STEEL CAN

CROSS-REFERENCE TO RELATED APPLICATION

This application claims the benefit of the priority filing date of the Provisional Patent Application bearing Ser. No. 60/481,700, filed on Nov. 25, 2003.

BACKGROUND OF THE INVENTION

1) Field of the Invention

The invention relates to circuit electrical mapping, and more particularly to the detection and identification of digital devices connected to a serial bus.

2) Prior Art of the Invention

There are multiple circuit designs to detect and identify digital devices that have a unique registration number. A popular digital device is an iButton® microprocessor, which can contain memory, a real-time clock, a temperature sensor or a transaction counter. The Dallas IButton® is normally connected via a one wire interface, that is a serial data bus. To troubleshoot or repair these circuits, the prior art teaches using a switching network consisting of a matrix to identify the location of a specific digital device. What is needed is a system that is comprised of essentially discreet modular units that can be added as needed. Further needed is a means of querying the circuit to identify the modules.

SUMMARY OF INVENTION

The invention is an electronic activating and identifying system that can be used to enable a microcontroller or microprocessor to identify a digital device amongst a plurality of similar devices. Typical of such a digital device is an iButton®, which is a generic group of microprocessors manufactured by Dallas Semiconductor, where the microprocessors is mounted in a protective metal can. Each digital device has a unique digital registration number, and is an element of a module. In addition to a digital device, the module has a dual addressable switch component having a first switch and second switch, where the dual addressable switch component has a unique digital address; a light emitting source; and a source of electrical power. The dual addressable switch component and the unique digital device are in electrical communication with a serial data bus. When the first switch of the unique addressable component is closed, the unique digital device can be accessed, and the unique digital registration number can be down loaded and correlated to the dual addressable switch component. The second switch of the unique addressable component can be closed activating the light emitting source utilizing the source of electrical power. The light emitting source provides an identifying position signal for the device. Typically, the light emitting source is an LED, and it is flashed on-and-off. The power source can be auxiliary or, if adequate, drawn directly off the bus. The total system is comprised of the plurality of modules. Each of the modules has a digital device (i.e., iButtons), where each digital device has a unique digital registration number, an associated dual addressable switch component having a unique digital address having a first switch and second switch; an associated light emitting source; and an associated source of electrical power.

The invention is also a method of utilizing an electronic activating and identifying system. The method comprises: selectively closing a first switch of a dual addressable switch component having a first switch and second switch, where the dual addressable switch component has a unique digital address, and where the dual addressable switch component is connected to a serial data bus; establishing communication between a database and a digital device, where each digital device has a registration number; querying, downloading and recording a module for the registration number of the digital device and its correlation with the address of dual addressable switch component; and selectively closing the second switch of the dual addressable switch component, therein activating the light emitting source. The method is repeated until the system is fully characterized as to an identification and an activation of all digital devices, where each digital device has a unique digital registration number, an associated dual addressable switch component having a unique digital address having a first switch and second switch; and an associated light emitting source. The method can now be used to locate a particular digital device by sending a signal along the serial bus to close the second switch of the associated dual addressable switch component, wherein said second switch therein activates the light emitting source associated with the particular digital device. Optionally, any or all of the digital devices can be taken offline by opening the associated first switch.

The invention departs from conventional approaches in that it lends itself to be substantially modular, and in essence the processor queries the circuit, developing a visual feedback when an iButton digital device is detected, and compiling the location and identity of the iButton digital device.

DETAILED DESCRIPTION

Figure 1:
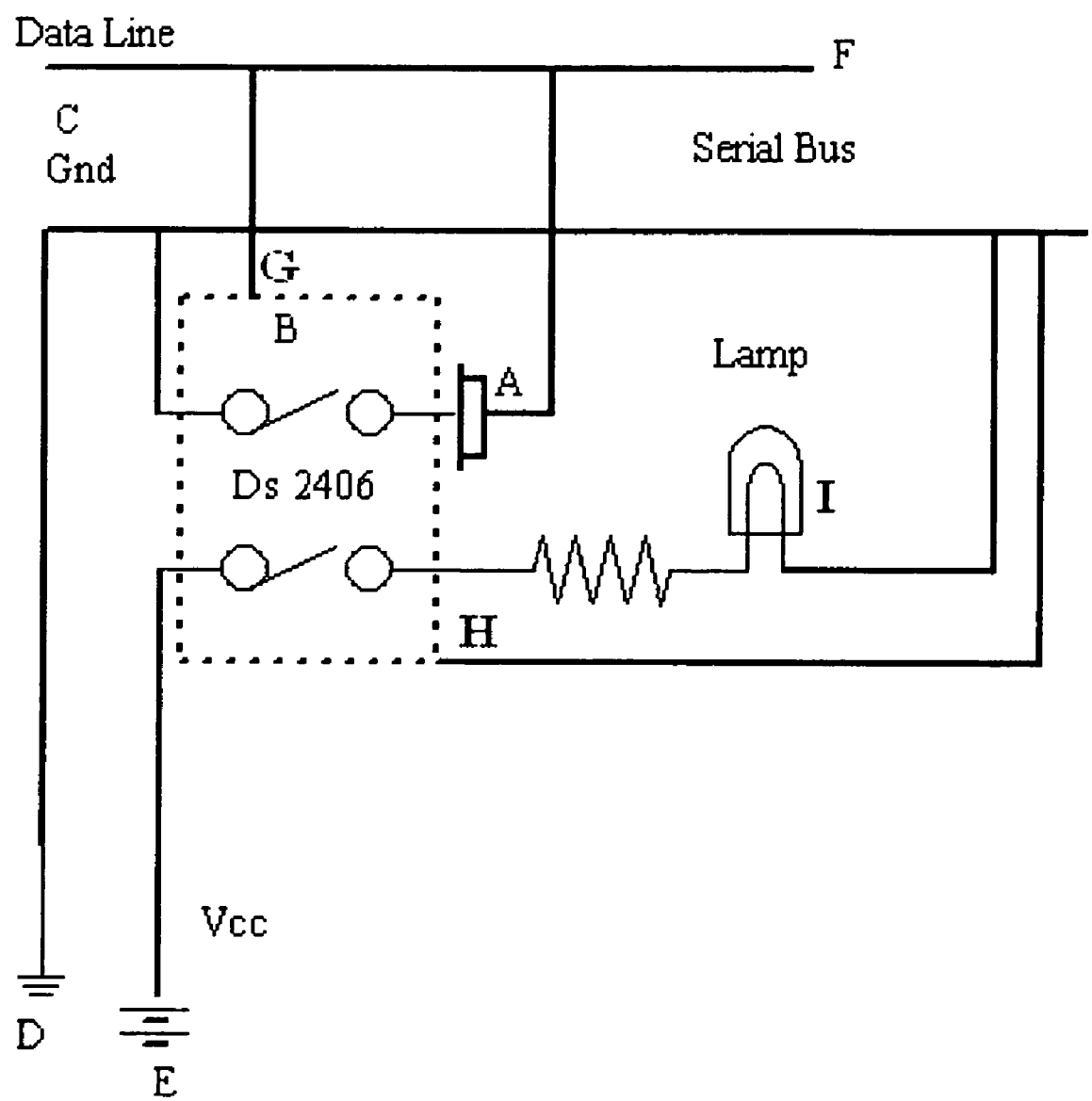
FIG. 1 is an electronic circuit diagram illustrating how a module having a digital device, such as an iButton, can be activated and identified.

The invention is a system of modules, where a module is a serial bus identification circuit that enables a microcontroller or microprocessor to identify a single digital device, such as a Dallas iButton digital device mounted on the module amongst a number of modules having iButtons digital devices, all connected to the same serial bus. Furthermore, the circuit of the module enables one to easily identify the location of any given iButton digital device; as the location has a flashing LED or other type of flashing lamp.

An iButton digital device is microprocessor enclosed in a 16 mm stainless steel can. Because of this unique and durable stainless steel can, up-to-date information can travel with a person or object anywhere they go. The steel button can be mounted virtually anywhere because it is rugged enough to withstand harsh environments, indoors or outdoors. The iButton digital device is durable enough to attach to a key fob, ring, watch, or other personal items and used daily for applications such as access control to buildings and computers.

Referring to FIG. 1, attached to the serial bus C is the addressable switch B, which is a dual addressable switch component (i.e., DS2406 a product of Dallas Semiconductor) that has a unique digital address. The addressable switch is connected to an iButton digital device connector, which is a touch and hold reader. The A switch of the DS2406 dual addressable switch component is used to switch the Ground Line D to the ground contact of the iButton digital device connector A. The DS2406 dual addressable switch component is has its own 64-bit ROM registration number that is factory lasered into the chip to provide a guaranteed unique identity for absolute traceability. The chip has 1024 bits of EPROM that can be used as electronic label to store information such as switch function, physical location, and installation date. Communication with the DS2406 dual addressable switch component follows the standard Dallas Semiconductor 1-Wire protocol and can be accomplished with minimal hardware such as a single port pin of a microcontroller. Multiple DS2406 dual addressable switch components can reside on a common 1-Wire network and be operated independently of each other. Individual chips will respond to a conditional search independently of each other. Also, individual chips will respond to a conditional search command if they qualify for certain user-specified conditions, which include the state of the output transistor, the static logic level or a voltage transition at the transistor's output command if they qualify for certain user-specified conditions, which include the state of the output transistor, the static logic level or a voltage transition at the transistor's output.

The data line is permanently connected to the data side of the iButton digital device's connector. The DS2406 dual addressable switch component is connected to the bus (see G and H). The ability to switch in a specific iButton digital device allows the controller to identify a specific iButton digital device, and then activate switch B of the DS2406 dual addressable switch component, which illuminates the lamp I. Lamp I is an LED. This identifies the location of the specific iButton digital device. The address of the dual addressable switch component can be stored in the controller's memory, and later used to sequentially switch each dual addressable switch component A switch on, and then read in the iButton digital device's registration number. Note: Multiple iButton digital devices can be connected to a one-wire bus and identified by each iButton digital device's unique registration number.

The disclosed invention allows the controller to build a database of DS2406 dual addressable switch components and the specific iButton digital devices (i.e., DS1990) connected to the switches contacts on a serial two-wire bus.

The control flow to identify a specific iButton digital device on the serial bus is as follows: Switch on the contacts that will connect DS1990 digital device to the serial bus; read in the serial number of the switched in DS1990 digital device; switch in the lamp contacts to illuminate lamp; and repeat process until a specific DS1990 digital device found.

The invented circuit can also be changed so that the light emitting source is connected to the serial bus, as apposed to the VCC connection. The change enables the whole circuit to operate without external power, and the power requirements are met by the bus. Modules can be added directly to the bus, essentially like a plug-and-play component on a PC.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

The invention claimed is:

1. An electronic activating and identifying module, comprising:
   one or more digital devices, wherein each of the one or more digital devices has a unique digital registration number;
   one of a key fob, ring, and watch coupled to each of the one or more digital devices for access control;
   a dual addressable switch component comprising a first switch and second switch, wherein the dual addressable switch component has a unique digital address;
   one or more light emitting sources, wherein each of the one or more light emitting sources corresponds to one of the one or more digital devices; and
   a source of electrical power;
   wherein the dual addressable switch component and the one or more digital devices are in electrical communication with a serial data bus;
   wherein closing the first switch of the dual addressable switch component enables one or more of the digital devices to be accessed, and one or more of the unique digital registration numbers to be correlated to the dual addressable switch component;
   wherein closing the second switch of the dual addressable switch component activates a light emitting source of the one or more light emitting sources responsive to a conditional search utilizing the source of electrical power; and
   wherein the light emitting source provides an identifying position signal for a digital device of the one or more digital devices responsive to the conditional search.

2. The electronic activating and identifying module according to claim 1, wherein the digital device comprises an iButton microprocessor that is enclosed in a steel can.

3. The electronic activating and identifying module according to claim 1, wherein each of the light emitting sources are light emitting diodes.

4. The electronic activating and identifying module according to claim 1, wherein the dual addressable switch component comprises an EPROM based chip that comprises a memory which can be used as an electronic label to store information comprising switch function, physical location, and installation date.

5. The electronic activating and identifying module according to claim 1, wherein the dual addressable switch component follows standard 1-Wire protocol.

6. An electronic activating and identifying system, comprising:
   a plurality of modules, wherein each of the plurality of modules is utilized for access control;
   wherein each of the plurality of modules comprises:
      one or more digital devices, wherein each of the one or more digital devices has a unique digital registration number;
      one of a key fob, ring, and watch coupled to each of the one or more digital devices for access control;
      a dual addressable switch component comprising a first switch and second switch, wherein the dual addressable switch component has a unique digital address;
      one or more light emitting sources, wherein each of the one or more light emitting sources corresponds to one of the one or more digital devices; and
      a source of electrical power;
      wherein the dual addressable switch component and the one or more digital devices are in electrical communication with a serial data bus;
      wherein closing the first switch of the dual addressable switch component enables one or more of the digital devices to be accessed, and one or more of the unique digital registration numbers to be correlated to the dual addressable switch component;
      wherein closing the second switch of the dual addressable switch component activates a light emitting source of the one or more light emitting sources responsive to a conditional search utilizing the source of electrical power; and wherein the light emitting source provides an identifying position signal for a digital device of the one or more digital devices responsive to the conditional search.

7. The electronic activating and identifying system according to claim 6, wherein the digital device has a unique factory-set 64-bit registration number.

8. A method of utilizing an electronic activating and identifying system, comprising:

providing at least one module, wherein the at least one module comprises a digital device with a unique digital registration number, an associated dual addressable switch component having a unique digital address comprising a first switch and second switch, an associated light emitting source, and an associated source of electrical power, and wherein the at least one module is coupled to one of a key fob, ring, and watch for access control;

performing a conditional search for the at least one module;

selectively closing the first switch of the dual addressable switch component wherein the dual addressable switch component is connected to a serial data bus;

establishing querying communication between a database and the at least one module;

downloading and recording the unique digital registration number of the digital device and its correlation with the unique digital address of the dual addressable switch component; and selectively closing the second switch of the dual addressable switch component, thereby activating the light emitting source.

9. The method of claim 8, wherein the steps of the method are repeated until the system is fully characterized as to all modules.

10. The method of claim 8, further comprising:

sending a signal along the serial data bus to close the second switch of the dual addressable switch component, wherein the second switch thereby activates the light emitting source associated with the module.

11. The method of claim 8, further comprising:

sending a signal along the serial data bus to open the first switch of the dual addressable switch component, wherein the first switch thereby takes any or all digital devices off line associated with the first switch.

* * * * *